US008781910B2

(12) United States Patent
McRae et al.

(10) Patent No.: US 8,781,910 B2
(45) Date of Patent: Jul. 15, 2014

(54) AUTOMOBILE HISTORY INFORMATION DELIVERY SYSTEM

(76) Inventors: Sarah Kathryn McRae, Tallahassee, FL (US); Charles Howard, Tallahassee, FL (US); Thomas Keels, Tallahassee, FL (US); Christopher Gamache, Tallahassee, FL (US)

( * ) Notice: Subject to any disclaimer, the term of this patent is extended or adjusted under 35 U.S.C. 154(b) by 158 days.

(21) Appl. No.: 13/252,760

(22) Filed: Oct. 4, 2011

(65) Prior Publication Data

US 2012/0084179 A1 Apr. 5, 2012

Related U.S. Application Data

(60) Provisional application No. 61/389,390, filed on Oct. 4, 2010.

(51) Int. Cl.
*G06Q 30/06* (2012.01)
*G06Q 30/08* (2012.01)

(52) U.S. Cl.
CPC ............ *G06Q 30/06* (2013.01); *G06Q 30/0623* (2013.01)
USPC ......................................... 705/26.1; 705/27.1

(58) Field of Classification Search
CPC ............................... G06Q 30/06; G06Q 30/80
USPC ................................................ 705/26.1, 27.1
See application file for complete search history.

(56) References Cited

U.S. PATENT DOCUMENTS

| | | | | |
|---|---|---|---|---|
| 2011/0087539 | A1 * | 4/2011 | Rubinstein et al. | 705/14.41 |
| 2011/0096174 | A1 * | 4/2011 | King et al. | 348/207.1 |
| 2011/0289010 | A1 * | 11/2011 | Rankin et al. | 705/313 |

* cited by examiner

*Primary Examiner* — James Zurita
(74) *Attorney, Agent, or Firm* — J. Wiley Horton; Adrienne C. Love

(57) ABSTRACT

A system and method for providing ready access to information about a vehicle offered for sale. A linking element is physically located on the vehicle. The linking element can assume many forms, with one example being a printed QR code on a "buyers guide" sticker or a separate sticker. A prospective purchaser uses a smart phone or other portable device to retrieve information based on the linking element. The smart phone then transmits this information over a communication link to a database containing information on many vehicles. The smart phone then receives the information back from the database on the specific vehicle queried where it may be reviewed by the user.

4 Claims, 7 Drawing Sheets

AUTOMOBILE HISTORY INFORMATION DELIVERY SYSTEM

CROSS-REFERENCES TO RELATED APPLICATIONS

This non-provisional application claims the benefit, pursuant to 37 C.F.R. §1.53(c), of an earlier filed U.S. provisional application. The earlier application was assigned U.S. Ser. No. 61/389,390, and was filed on Oct. 4, 2010.

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of vehicles. More specifically, the present invention comprises a method for providing a linking element on a vehicle which is used to obtain vehicle history information from a database.

2. Description of the Related Art

The purchase and sale of used vehicles has become increasingly sophisticated in recent years. Buyers wish to know information regarding a used vehicle's accident history and other things. The US Department of Justice (DOJ) has established a national reporting database called the National Motor Vehicle Title Information System ("NMVTIS"). Persons and businesses involved with buying and selling vehicles are required to provide specified information to this database. The information includes: (1) whether the vehicle has been declared a total loss; (2) whether the vehicle has a salvage disposition (3) whether the vehicle has been damaged in a flood; (4) whether the vehicle has current or historical odometer reading(s) provided by a state jurisdiction; (5) the vehicle's current and/or prior title history; (6) other pertinent brand information relating to a vehicle's usage and/or condition; and (7) other data that may be added to the NMVTIS report including theft, owner and lien holder information.

Anyone can access the DOJ's NMVTIS website using designated service providers. Upon payment of a fee, the user may then obtain the NMVTIS information pertaining to a specific vehicle identification number. Unfortunately, the existing information delivery system is not particularly convenient for a user who is physically walking around a retail or wholesale car lot or an auction facility viewing prospective purchases. Such a user may not have web access and—even if he or she has access on a "smart phone" or similar device—it is not convenient to type in a lengthy vehicle identification number and other information for every vehicle the user considers. It would therefore be advantageous to provide a system which provides a user with convenient access to the NMVTIS or similar information while the user is in a car lot viewing prospective purchases. The present inventive method provides such a solution.

BRIEF SUMMARY OF THE INVENTION

The present invention comprises a system for providing ready access to information about a vehicle offered for sale. A linking element is physically associated with the vehicle. The linking element can assume many forms, with one example being a printed Quick Response code ("QR code") on a Federal Trade Commission (FTC) required "buyers guide" disclosure form. A separate sticker incorporating the QR code may also be used. A prospective purchaser uses a smart phone or other portable device to retrieve vehicle history information from the linking element. The smart phone then transmits a request based on the linking element over a communication link to a database containing information on many vehicles. The smart phone then receives the vehicle history information on the specific vehicle back from the database where it may be reviewed by the user.

A linking element may also be provided on a temporary license tag prepared by a dealer. The linking element on the tag preferably allows the user to link to a database containing additional information regarding the dealer and the sales transaction. A linking element may also be provided on a registration or title application form prepared by a business entity. This additional information may be used to automate processes such as applying for a title when the vehicle is purchased.

REFERENCE NUMERALS IN THE DRAWINGS

| | | | |
|---|---|---|---|
| 10 | car | 12 | window |
| 14 | report sticker | 16 | buyers guide form |
| 18 | tag | 20 | communication link |
| 22 | smart phone | 24 | computer |
| 26 | database server | 28 | printer |
| 30 | QR code | 32 | descriptive summary |
| 34 | top level indicators | 36 | title application |
| 38 | population data field | 40 | display |

DETAILED DESCRIPTION OF THE INVENTION

The present invention provides a "linking element" which is physically associated with a vehicle being offered for sale. The linking element facilitates access to additional information which is specific to that vehicle. The linking element may assume many forms. Examples include RFID tags and printed "Quick Response Codes" (QR codes). QR codes offer advantages in terms of security, the amount of information they can store, and the speed at which they can be read by a device using a digital camera. The QR code therefore represents the preferred embodiment and it will be used in the examples described hereafter.

Figure 1:
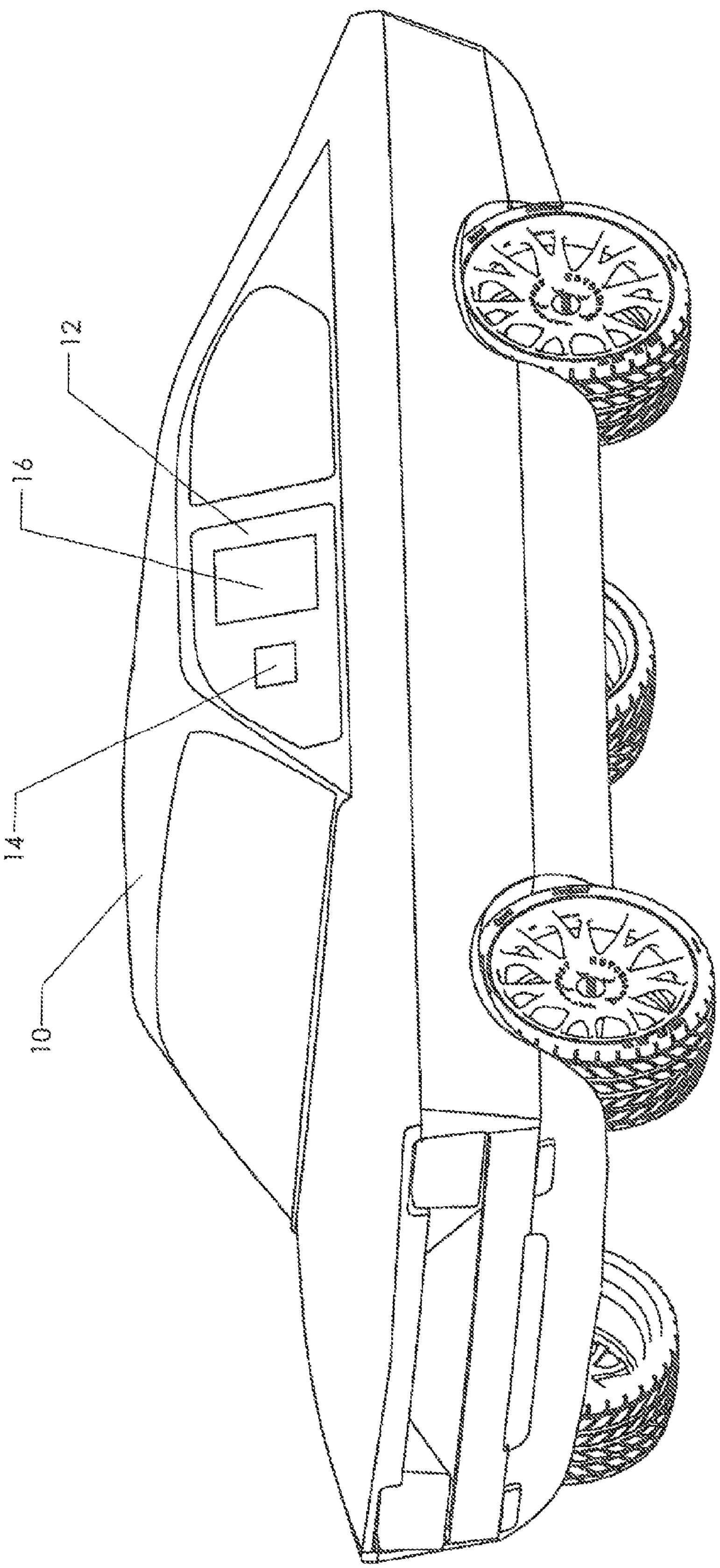
FIG. 1 is a perspective view, showing the stickers which are typically placed in the window of a vehicle being offered for sale.

FIG. 1 shows a car 10 sitting on a lot where it is being offered for sale. The familiar buyers guide sticker 16 is affixed to a window 12. Under the present inventive method, it is preferable to provide a QR code in a location where it is visible to the prospective buyer. It can be provided on a separate report sticker 14 or on buyers guide sticker 16 itself.

Figure 4:
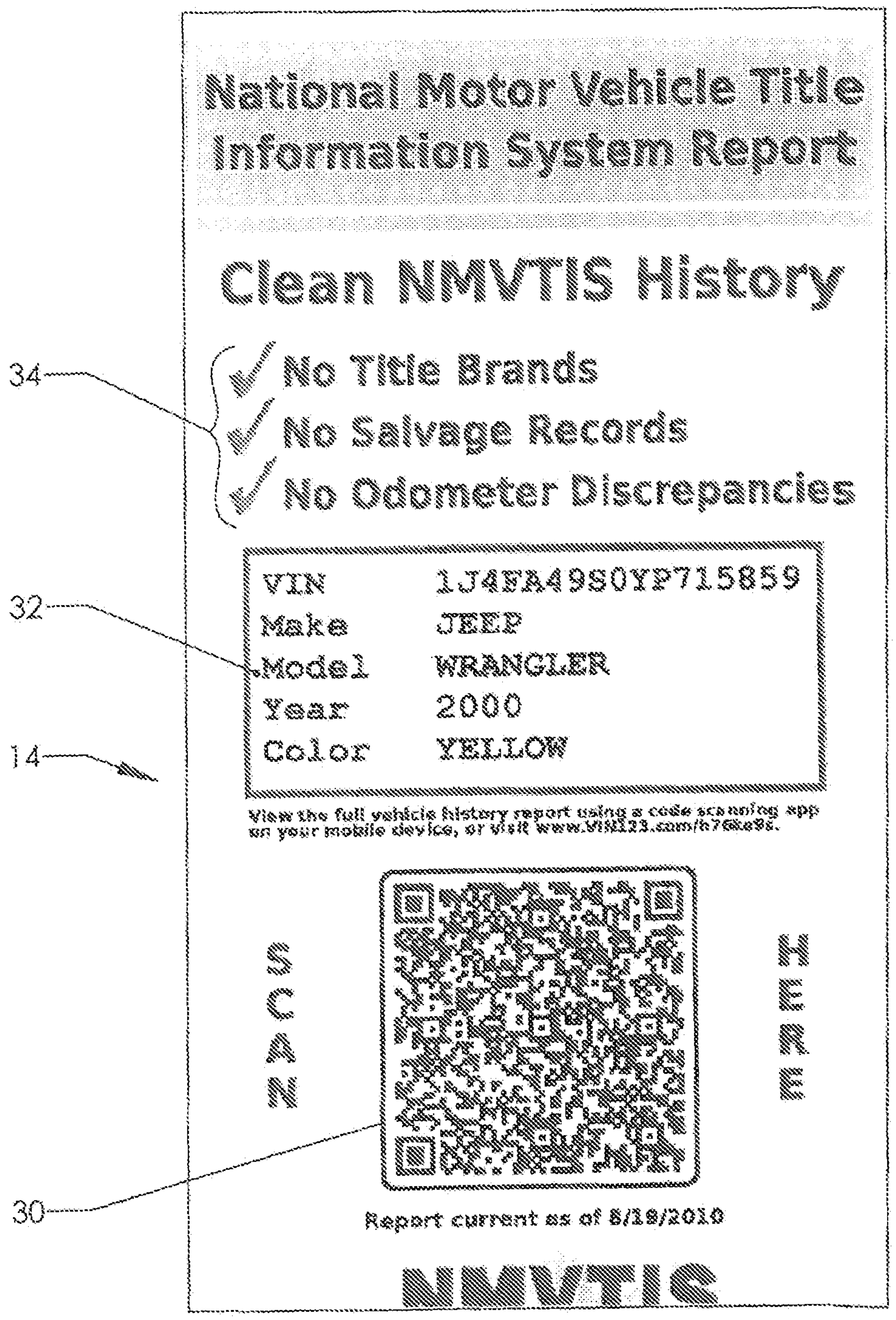
FIG. 4 is a view showing a representative linking element in a window sticker.

FIG. 4 shows a view of a representative report sticker 14. The sticker includes QR code 30—preferably in a prominent location. The user needs a device which can read the QR code. There are many such devices, including a dedicated code scanning device. However, it is now possible to use a cell phone camera to read a QR code.

Figure 3:
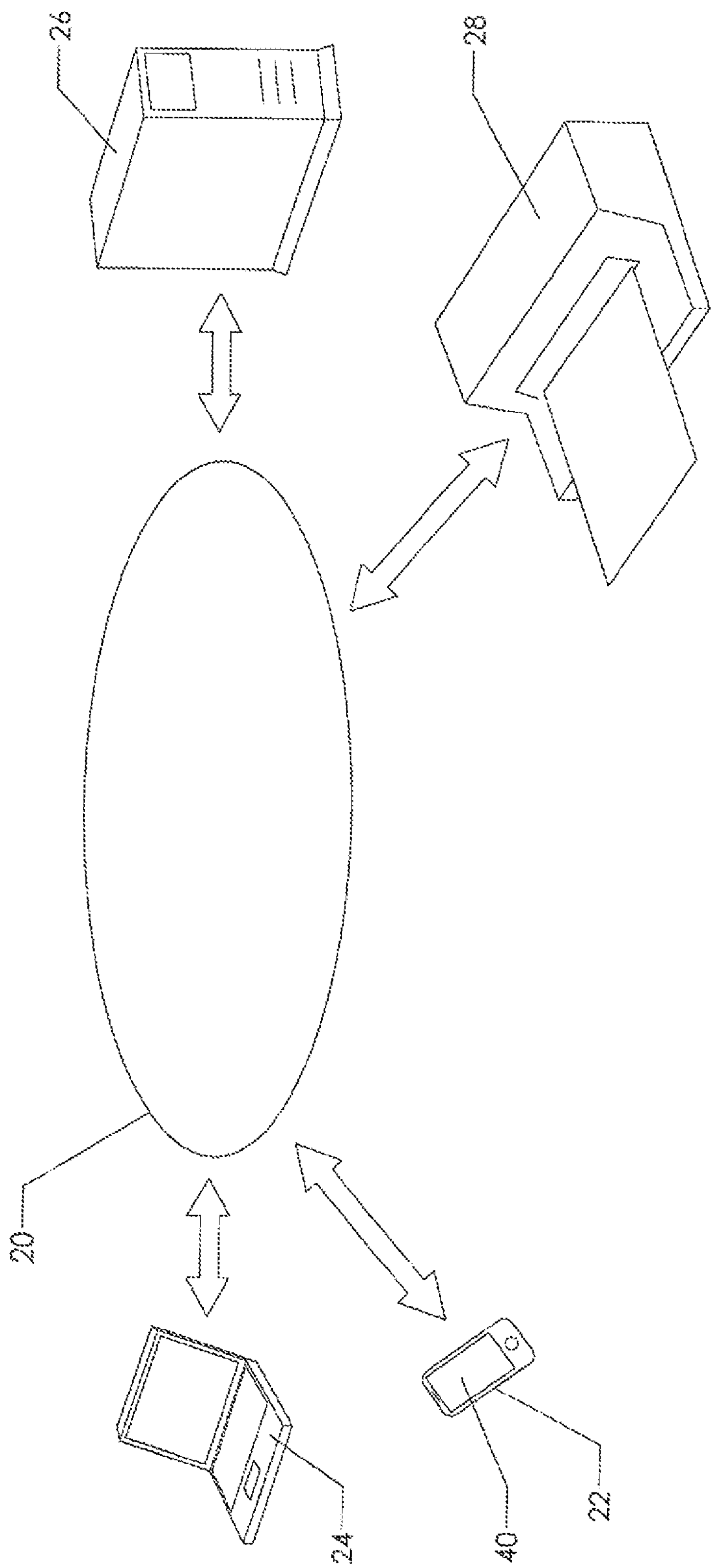
FIG. 3 is a schematic view, showing the exchange of information between various components used in the present inventive method over a communication link.

As will be familiar to those skilled in the art, a user can point a smart phone camera at the QR code and—assuming an appropriate software application is available on the smart phone—"capture" the QR code. FIG. 3 shows a simplified representation of a smart phone 22. This device includes display 40 and a camera lens on the side facing away from the viewer. The user points the camera lens at the QR code and aligns the QR code using display 40. The application running on the smart phone then interprets the information contained in the QR code. This information is preferably a Uniform Resource Locator ("URL") which indicates where a certain resource is available on the Internet and the means in which a user can retrieve that resource. The smart phone then links to a database server via a web-site on the telephone's browser and retrieves additional information about the specific vehicle.

Returning now to FIG. 4, it is preferable to provide descriptive summary 32 on the report sticker so that the dealer can ensure that the QR code is affixed to the correct vehicle. The descriptive summary also allows the prospective buyer to establish that the sticker is on the correct vehicle by matching the contents of the descriptive summary to what the user observes.

Top level indicators 34 may also be provided to quickly advise the purchaser that there are no serious issues in the history of a particular vehicle. Many purchasers will not wish to run the database retrieval operation on a vehicle with a significant problem. Thus, top level indicators 34 are provided as an initial step in the screening process.

FIG. 3 pictorially depicts some of the communications taking place as the present inventive method is carried out. Communication link 20 represents any effective method or methods for linking the other devices to database server 26. As one example, smart phone 22 can communicate wirelessly using a WiFi network on a car dealer's lot. The request information from the smart phone may then be transmitted over the Internet to database server 26. The database server communicates with an appropriate database (such as NMVTIS) to retrieve the information for the specific vehicle. That information is then transmitted back over the Internet and ultimately to smart phone 22.

FIG. 3 shows other devices which may also form a part of the process. The prospective purchaser may wish to have information on one or more vehicles sent to a separate computer 24 which he or she designates. This feature allows the purchaser to subsequently review the information using a larger and more convenient display than is typically found on a smart phone.

The database server depicted in FIG. 3 may in fact include a "message switch" function that links the user to one or more information databases and possibly to other functions. As an example, once the user elects to purchase a particular vehicle, the QR code could link the user's smart phone or other computer to a website which assists the user in applying for a title.

A dealer is preferably allowed to create the report stickers, temporary tags, and other items featuring the linking element on-site. Thus, printer 28 is also tied to communication link 20 so that the appropriate data can be sent for the creation of the QR codes. The printer will more likely be linked to a computer at the dealer's facility and that computer will then be tied to communication link 20. There are many other ways to provide the printing utility, so the simplified depiction of FIG. 3 should properly be viewed as one example among many others.

Figure 5:
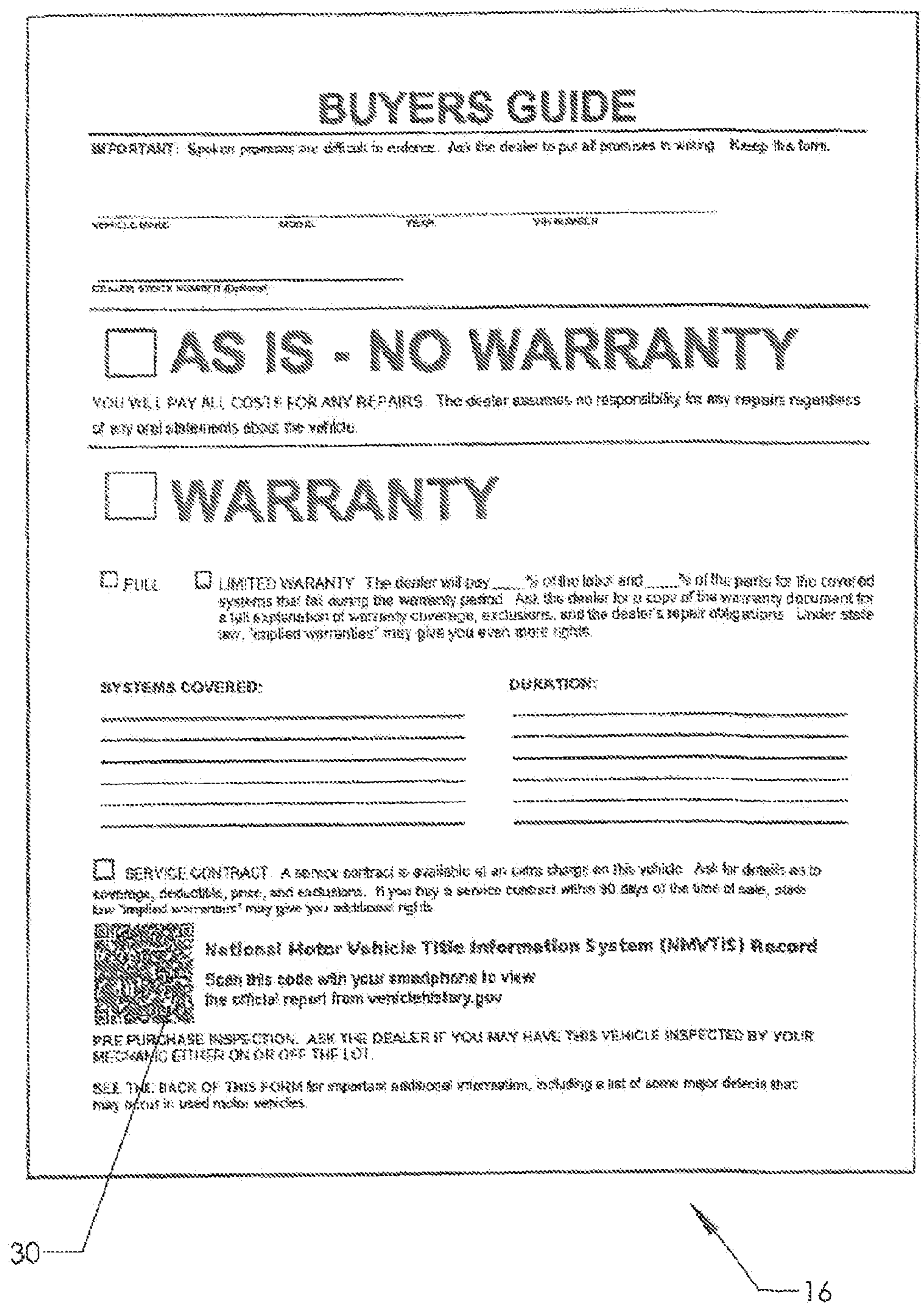
FIG. 5 is a view showing a representative linking element included in a "buyers guide" sticker.

Of course, some dealers may not wish to provide a separate report sticker. In that case, the linking element can be printed as part of the standard "Buyers Guide" which must be placed on all vehicles offered for sale. FIG. 5 shows buyers guide sticker 16 with incorporated QR code 30. Portions of the Buyers Guide are mandated by Federal Trade Commission requirements. Other portions may be used by the dealer, however. QR code 30 may be included in one of these other portions.

Figure 2:
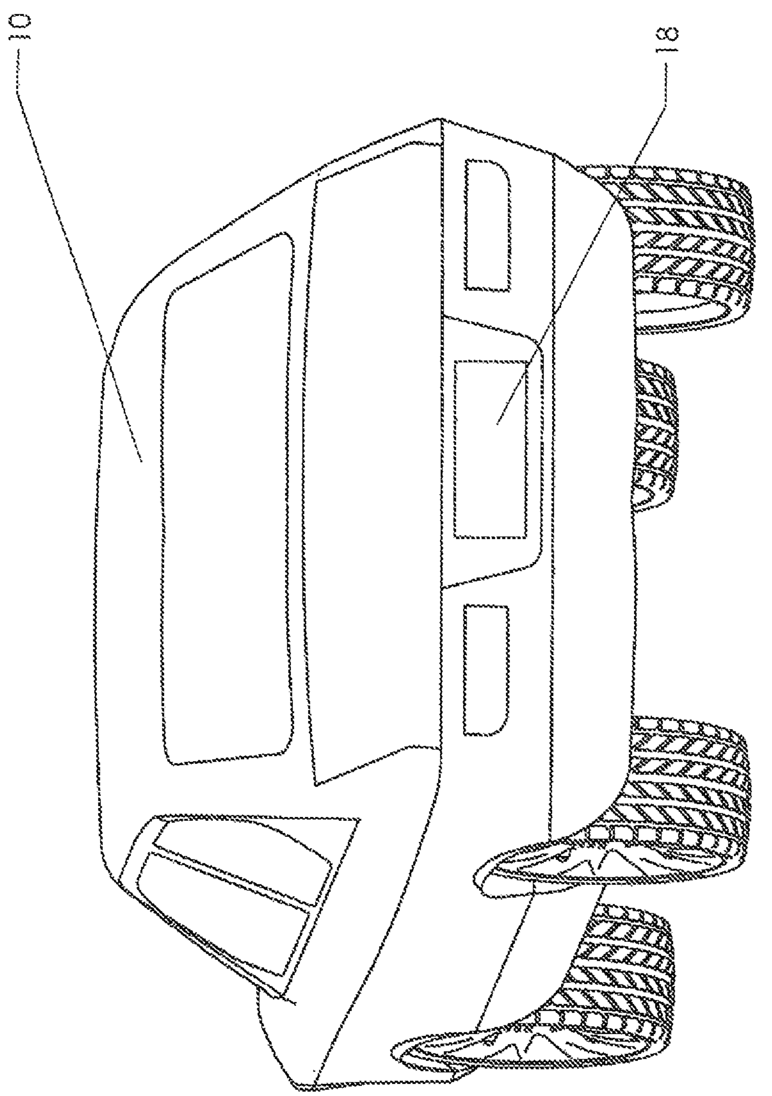
FIG. 2 is a perspective view, showing the location of a license plate on a vehicle.
Figure 7:
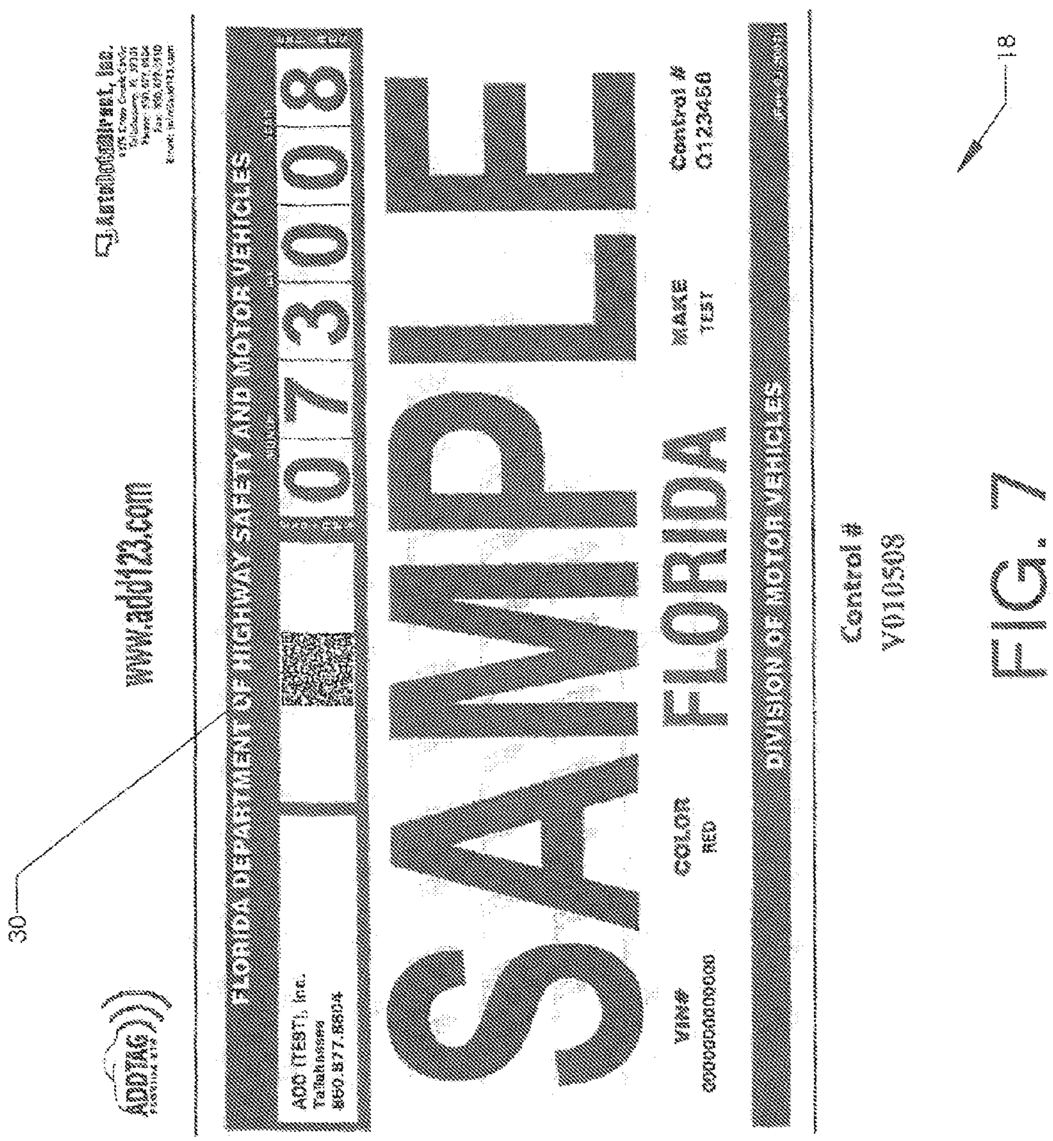
FIG. 7 is a view showing a representative linking element included in a temporary license plate.

The dealer may also wish to include a linking element in a temporary tag created once a purchase is consummated. FIG. 2 shows a temporary tag 18 affixed to car 10 at the time of purchase. FIG. 7 shows a detailed view of a representative temporary tag 18. QR code 30 is included on the tag itself. The inclusion of the QR code allows the purchaser and other persons (such as law enforcement personnel) to ensure that the temporary tag has been lawfully issued for the vehicle purchased.

Figure 6:
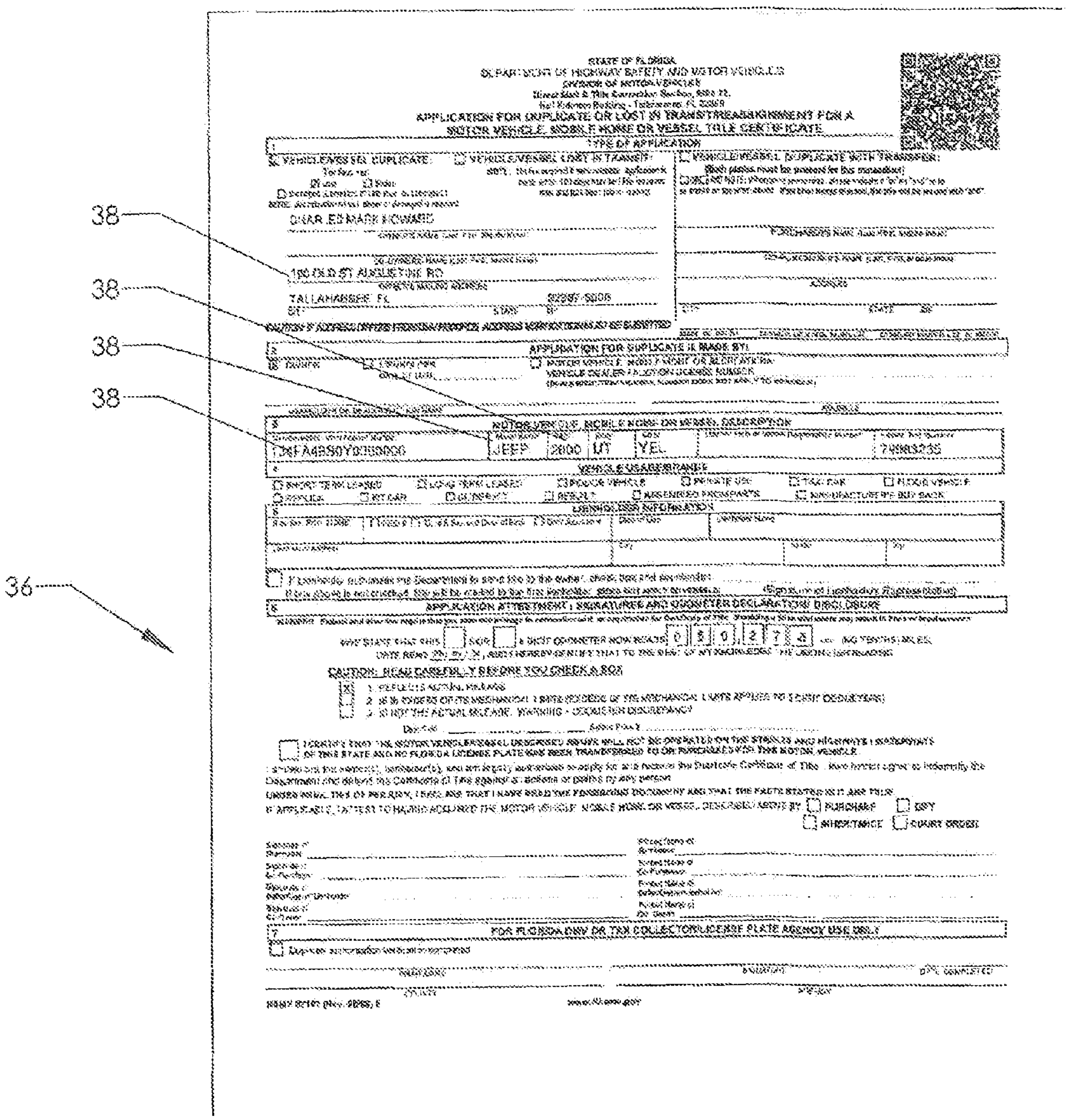
FIG. 6 is a view showing how data obtained through the present inventive method can be used to automatically populate data fields in a title application form.

The QR code can be used for many additional purposes. As one example, when the purchaser drives away with the temporary tag a title and permanent tag must be applied for. The applicant must typically fill in a title application form. Using the present inventive method, the applicant can again scan the QR code on the tag and be linked to a website which walks the applicant through a title application process. This site can be furnished with information already recorded by the dealer (such as the purchaser's name, address, etc.). The system can automatically pull up a title application form such as depicted in FIG. 6. Title application 36 includes numerous data fields which the applicant is required to fill in. The system can automatically populate these data fields by creating populated data fields 38 on the basis of information already provided by the dealer. In the example shown, the purchaser's name, purchaser's address, vehicle identification number, vehicle make, vehicle model year, body style, color, and odometer information have all been filled in automatically.

The system preferably also includes provisions whereby the user may be charged for the services requested. As an example, if the user requests a comprehensive search of the vehicle's history, a charge can be assessed using a credit card or other means.

If the user is directed to an application which assists in applying for a title and permanent tag, the user may also be provided with links to other services he or she may need. Examples include liability insurance providers, maintenance providers specific to the make and model, car wash facilities, etc.

The preceding description contains significant detail regarding the novel aspects of the present invention. It should not be construed, however, as limiting the scope of the invention but rather as providing illustrations of the preferred embodiments of the invention. As an example, although QR codes have been used as the example in the embodiments disclosed in detail, other types of linking elements could be substituted. Such variations would not alter the basic functions of the invention. Thus, the scope of the invention should be fixed by specific claims, rather than by the examples given.

We claim:

1. A method for providing ready access to information about a vehicle offered for sale to a user, further comprising the steps of:

a. providing a quick response code physically located on said vehicle, wherein said quick response code stores a Uniform Resource Locator;

b. providing a scanning device having the ability to capture said quick response code and access said Uniform Resource Locator;

c. wherein said Uniform Resource Locator directs said scanning device through a communication link to a web-site having a database server containing said information about said vehicle offered for sale;

d. wherein said scanning device retrieves said information via said communication link;

e. wherein said information about said vehicle offered for sale is stored on said scanning device such that said user can access said information;

f. providing a report including said quick response code;

g. providing a plurality of top level indicators; and h. providing a descriptive summary identifying said vehicle which said report is physically located on.

2. The method of claim 1, wherein said seller collects data upon purchase of said vehicle from a user, and wherein said user must complete a title application form having a plurality of data fields for a permanent tag after said purchase, further comprising the steps of:

a. providing a database having said data collected by said seller;

b. providing a temporary tag including a second quick response code;

c. wherein said scanning device captures said second quick response code and through said communication link and accesses a web-site having said title application form;

d. wherein said data collected by said seller populates said data fields on said title application form;

e. wherein said quick response code accesses said title application form which corresponds to said purchaser;

f. wherein said scanning device retrieves said title application form via said communication link; and g. wherein said title application form is stored on said scanning device such that said user can access said information.

3. The method of claim 1, further comprising the steps of providing a buyer's guide form including said quick response code.

4. The method of claim 1, further comprising the steps of providing a buyer's guide form having said quick response code.

* * * * *